Patented May 29, 1923.

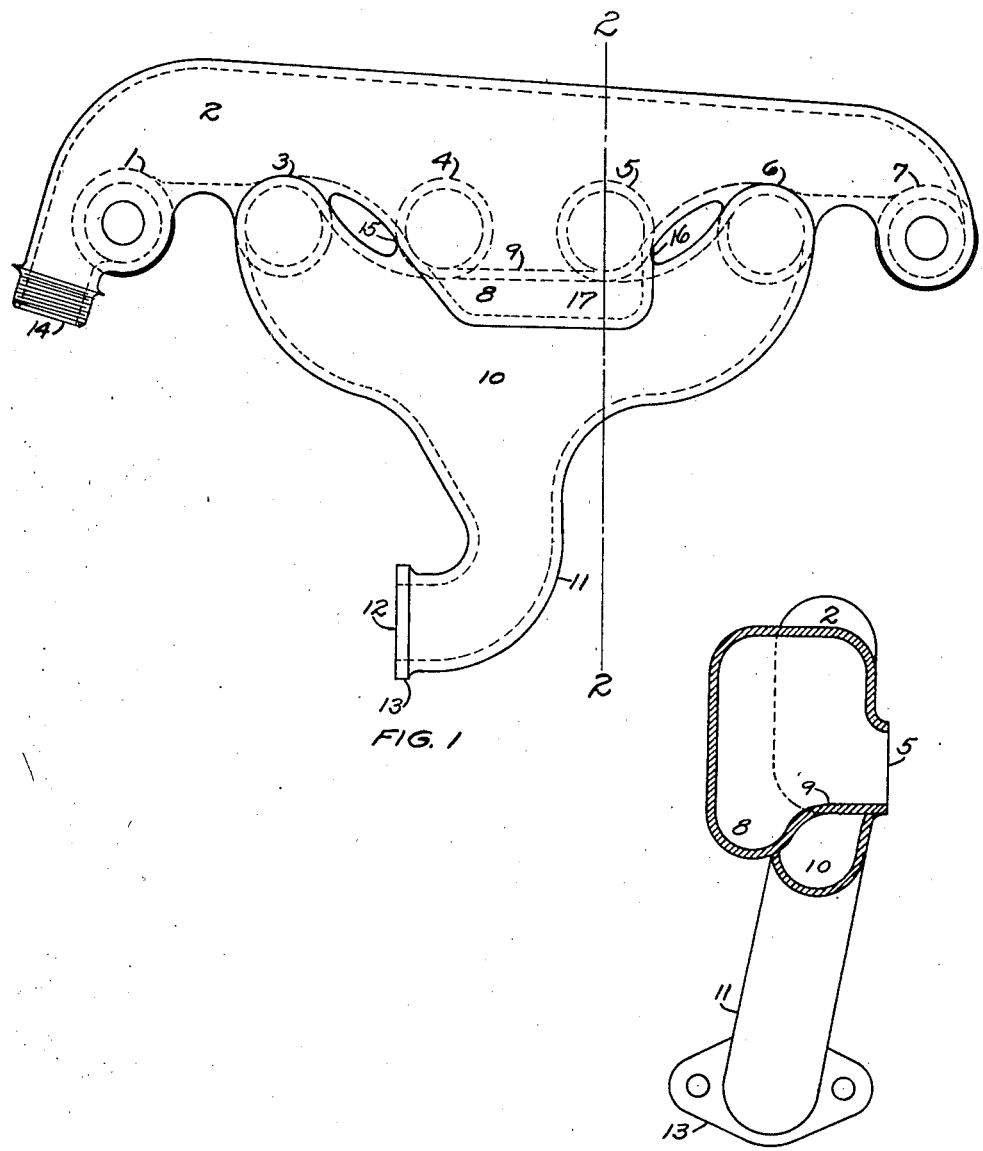

1,457,003

UNITED STATES PATENT OFFICE.

PHILIP SAMUELS, OF LOWELL, MASSACHUSETTS.

MANIFOLD FOR GASOLINE ENGINES.

Application filed June 25, 1920. Serial No. 391,745.

*To all whom it may concern:*

Be it known that I, PHILIP SAMUELS, a citizen of the United States, residing at Lowell, in the county of Middlesex and State of Massachusetts, have invented certain new and useful Improvements in a Manifold for Gasoline Engines, of which the following is the specification.

My invention relates to an improvement in a manifold for an internal combustion engine in which the exhaust and intake manifold in combination have a heating chamber which is a projection from the exhaust manifold extending horizontally and vertically downwards to cover the upper side and central exterior part of the intake manifold and is arranged to receive the burnt gases coming from the engine to permit said burnt gases to flow in said heating chamber and out to the exhaust manifold.

The objects of my improvements are

First. To provide automatically a necessary degree of heat on the central upper interior part of the intake manifold;

Second. To provide a degree of heat in the said intake manifold high enough to transform all the unvaporized liquid in the intake manifold into a dry vaporized gas before the said gases get into the engine;

Third. To eliminate carbon in the engine;

Fourth. To prevent the unburnt liquid from going by and between the pistons and cylinder walls into the lubricating oil.

I attain these objects by the combination illustrated in the accompanying drawings, in which;—

Fig. 1 is a side elevation of the entire exhaust and intake manifold with the heating chamber combined;

Fig. 2 shows section through and upon line 2—2 of Figure 1.

Similar numerals refer to similar parts throughout the several views.

In Figure 1, adjoining wall 9 joins one side of the intake manifold to the exhaust manifold from point 15 to 16.

Heating chamber 8 is a projection from the exhaust manifold extending horizontally and vertically downwards to cover the central upper exterior side part of the intake manifold, forming a chamber to receive the exhaust burned gases coming from the engine from port-hole 5, and compelling a portion of the burned gases to flow in heating chamber 8, and out into exhaust manifold 2.

17 represents that part of the intake manifold which is covered by heating chamber 8.

Exhaust burned gases come from the engine through port-hole 5, and compel a portion of the burned gases to flow into heating chamber 8, and heating surface of 17 of intake manifold. Said burned gases pass out of heating chamber into the exhaust manifold 2.

I claim:

The combination with an explosive engine having an exhaust manifold wholly enclosed, of a Y-shaped intake manifold mounted adjacent to said exhaust manifold and having an opening in the crotch of the Y so positioned that a portion of the exhaust manifold forms a wall for the closure of the opening in and extends to form an offset chamber over the intake manifold.

PHILIP SAMUELS.

Witnesses:
EDWARD J. DONNELLY,
ETHEL L. WRIGHT.